United States Patent
Aubauer et al.

(10) Patent No.: US 9,323,379 B2
(45) Date of Patent: Apr. 26, 2016

(54) ELECTRONIC DEVICE WITH A USER INTERFACE THAT HAS MORE THAN TWO DEGREES OF FREEDOM, THE USER INTERFACE COMPRISING A TOUCH-SENSITIVE SURFACE AND CONTACT-FREE DETECTION MEANS

(75) Inventors: Roland Aubauer, Wessling (DE); Roman Gebhard, Munich (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 952 days.

(21) Appl. No.: 13/315,739

(22) Filed: Dec. 9, 2011

(65) Prior Publication Data

US 2013/0147833 A1 Jun. 13, 2013

(51) Int. Cl.
*G09G 5/00* (2006.01)
*G06F 3/041* (2006.01)
*G06F 3/033* (2013.01)
*G06F 3/044* (2006.01)

(52) U.S. Cl.
CPC .............. *G06F 3/0416* (2013.01); *G06F 3/044* (2013.01); *G06F 2203/04106* (2013.01); *G06F 2203/04108* (2013.01)

(58) Field of Classification Search
CPC ... G06F 3/0488; G06F 3/041; G06F 3/03547; G06F 2203/04808; G06F 3/0416; G06F 3/044
USPC .......................................................... 345/619
See application file for complete search history.

(56) References Cited

U.S. PATENT DOCUMENTS

| | | | | |
|---|---|---|---|---|
| 5,335,557 A | * | 8/1994 | Yasutake | ................... 73/862.043 |
| 6,009,394 A | * | 12/1999 | Bargar | ..................... G06F 3/011 |
| | | | | 381/17 |
| 6,249,606 B1 | * | 6/2001 | Kiraly | ................ G06K 9/00409 |
| | | | | 345/156 |
| 2010/0040173 A1 | * | 2/2010 | Ishii | ............................... 375/316 |

(Continued)

FOREIGN PATENT DOCUMENTS

| | | | | |
|---|---|---|---|---|
| WO | 2005/121938 A2 | 12/2005 | .............. G06F 3/041 |
| WO | 2011/128116 A2 | 10/2011 | .............. G06F 3/044 |

OTHER PUBLICATIONS

International Search Report and Written Opinion, Application No. PCT/EP2012/074718, 18 pages, May 10, 2013.

(Continued)

*Primary Examiner* — Ryan R Yang
(74) *Attorney, Agent, or Firm* — Slayden Grubert Beard PLLC

(57) ABSTRACT

The invention relates to an electronic device for determining a first positional information and a second positional information regarding a user input object, such as at least one user hand or at least one stylus, the electronic device comprising: a touch-sensitive surface; contact-free detection means; and controller means that are operatively connected to the touch-sensitive surface and to the contact-free detection means; wherein the first positional information depends on where the user input object contacts the touch-sensitive surface, and wherein the second positional information depends on the spatial configuration of the user input object with regard to the touch-sensitive surface, characterized in that the controller means are adapted for simultaneously and/or alternately determining the first positional information via the touch-sensitive surface and the second positional information via the contact free detection means.

29 Claims, 9 Drawing Sheets

(56) References Cited

U.S. PATENT DOCUMENTS

| | | | |
|---|---|---|---|
| 2010/0117970 A1 | 5/2010 | Burstrom et al. | 345/173 |
| 2010/0156804 A1* | 6/2010 | Young | 345/173 |
| 2011/0007021 A1 | 1/2011 | Bernstein et al. | 345/174 |
| 2011/0175830 A1 | 7/2011 | Miyazawa et al. | 345/173 |
| 2012/0206380 A1* | 8/2012 | Zhao et al. | 345/173 |

OTHER PUBLICATIONS

Partial International Search Report, Application No. PCT/EP2012/074718, 2 pages, Feb. 15, 2013.

European Office Action, Application No. 12808288.0, 8 pages, Aug. 27, 2015.

\* cited by examiner

ELECTRONIC DEVICE WITH A USER INTERFACE THAT HAS MORE THAN TWO DEGREES OF FREEDOM, THE USER INTERFACE COMPRISING A TOUCH-SENSITIVE SURFACE AND CONTACT-FREE DETECTION MEANS

TECHNICAL FIELD

The disclosed invention in general terms relates to electronic devices with a user interface having more than two degrees of freedom. In particular the invention relates to electronic devices that employ touch-sensitive surfaces, such as trackpads or touch-sensitive displays, as part of their user interfaces.

BACKGROUND

Electronic devices with user interfaces in the form of touch sensitive surfaces, such as touchpads and touch-sensitive displays (also referred to as "touch screens" or "touchscreens"), are well known in the art. Touch-sensitive surfaces may serve as a user-interface by detecting a user input object (such as a stylus, a user finger, or a user hand) that touches an active area of the surface. Thereby, the touch-sensitive surface not only detects that an object touches its active area; rather, it also detects where the object makes contact with the active area, i.e., the touch-sensitive display may extract positions (such as x- and y-coordinates) of the contact area (for example, the geometric mean position or, if the active area is divided into segments, all segments that are contacted) between the touch-sensitive surface and said user input object. A wide variety of different sensor technologies may form the basis of touch-sensitive surfaces. Accordingly, touch-sensitive surfaces may be based on resistive, capacitive (e.g., surface capacitive projected capacitive, mutual capacitive, or self capacitive), surface acoustic wave, infrared, optical imaging, dispersive signal, and acoustic pulse recognition sensor technology. Depending on their sensor technology, some touch-sensitive surfaces are suitable for detecting only a single contact, and other touch-sensitive surfaces are suitable for detecting multiple contacts.

Touch-sensitive surfaces in the form of a touch-sensitive display fulfill an additional function: they display information generated by their respective electronic devices.

When an area of the touch-sensitive surface is touched, the touch-sensitive surface extracts positional information from the touch event, submits the extracted positional information to controller means of the electronic device. Depending on the current state of the electronic device, the electronic device may remain in the current state or is transitioned into another state. This functionality allows the user of such an electronic device with a touch-sensitive surface to exert control over functions of the electronic device. Considering a telephone as an example electronic device, the user may unlock the telephone, place a call, or call up an address book. Considering a personal computer (or tablet computer) as another example electronic device, the user may place commands regarding a graphical user interface, change the perspective of a displayed object (such as a map), etc.

Touch-sensitive surfaces primarily generate a two-dimensional data representing the mean position of a physical contact between user input object and the touch sensitive surface. Accordingly, touch-sensitive surfaces acting as user interfaces allow for user input with only two degrees of freedom.

However, many applications running on electronic devices require three- or multi-dimensional control possibilities extending beyond conventional two-dimensional control (i.e., two degrees of freedom) provided by regular user interfaces, such as touch-sensitive surfaces, computer mice, and track balls. Examples thereof are applications that display three-dimensional content, such as: Google Earth (and similar systems for providing geographic information); 3D rendering software for 3D construction and 3D visualization (e.g., AutoCAD 3D, Photoshop, cinema 4D); user interfaces displayed in three dimensions by 3D televisions and 3D mobile phones; and 3D games. For providing control in 3D environments, it is self-evident that more than two degrees of freedom are desirable.

In the prior art, it is known to provide user interfaces with additional degrees of freedom, extending beyond conventional two-dimensional control, by providing additional control elements. Examples for such additional control elements are computer mouse scroll wheels as well as look and move joysticks. These control elements, nonetheless, impose a series of problems: First, they are typically not based on or agree with the user's intuition and are thus not readily learned or understood. Further, according additional control elements are typically bulky and impractical to carry along with, especially in view of state of the art mobile devices (e.g., tablet computers and mobile phones) that typically comprise little more than a touch-sensitive surface and/or display as its primary user interface. Additional control elements do not integrate seamlessly with such touch-sensitive surfaces. On the contrary, the user perceives them as differing from touch-sensitive surfaces in nature and character to the point of incompatibility. Finally, these additional control elements have in common that they are subject to significant mechanical wear.

Accordingly, there is a need for more intuitive, user-friendly multi-dimensional control possibilities that integrate seamlessly with electronic devices (in particular small-scale, mobile electronic devices) with touch-sensitive surfaces, such as mobile phones and tablet computers, and that experience no mechanical wear.

The present invention has been devised and embodied to overcome at least some of the abovementioned shortcomings and to obtain further advantages.

SUMMARY OF THE INVENTION

The invention is set forth and characterized in claims 1, 19, and 21, while the dependent claims describe other characteristics of the invention According to an aspect of the invention, an electronic device is adapted for determining a first positional information and a second positional information regarding a user input object. An electronic device in this sense may be any electronic device that is itself a user interface or comprises a user interface, such as a mobile phone, an mp3 player, a PDA, a tablet computer, a computer, a remote control, a radio, a computer mouse, a touch-sensitive display, and a television. A user input object may be anything like a stylus (e.g., a small pen-shaped instrument) or a digital pen. A user input object in this sense may also be a user's hand or finger. Preferably, the user input object may include one or more separate or connected parts, such as multiple fingers or even two hands. Nevertheless, depending on how an embodiment of the invention is designed, the user input object must fulfill certain requirements, i.e. must have certain electrical and/or optical properties, in order to qualify as a suitable user input object. What is to be understood under the first and the second positional information will be described with regard to a controller comprised by the electronic device.

The electronic device comprises a touch-sensitive surface. A touch-sensitive surface in the sense of this application is any user-interface device suitable for determining first positional information in dependence of where a user input object touches an active area of the touch-sensitive surface (in the sense of this application "touching the touch-sensitive surface" refers to "touching the active area of the touch-sensitive surface"). For this purpose, the touch-sensitive surface not only detects that an object touches its active area; rather, it also detects where the object makes contact with the active area, i.e., the touch-sensitive surface may extract positions (such as x- and y-coordinates) of the contact area (for example, the geometric mean position or, if the active area is divided into sensor segments, all sensor segments that are contacted) between the touch-sensitive surface and said user input object. Thereby, the touch-sensitive surface determines the first positional information, the first positional information depending (or solely depending) on where the user input object contacts the touch sensitive surface. A wide variety of different sensor technologies may form the basis of touch-sensitive surfaces. Accordingly, they may be based on resistive, capacitive (e.g., surface capacitive projected capacitive, mutual capacitive, self capacitive), surface acoustic wave, infrared, optical imaging, dispersive signal, and acoustic pulse recognition sensor technology. Depending on the sensor technology, some touch-sensitive surfaces are suitable for detecting only a single contact, and other touch-sensitive surfaces are suitable for detecting multiple contacts. Further, the sensor technology imposes restraints on what may serve as a user input object. A touch-sensitive surface based on capacitive sensor technology, for example, cannot detect a user finger/hand through insulating material such as a glove. A touch-sensitive surface may also be a touch-sensitive display and thereby fulfill an additional function: displaying information generated by the electronic device.

The electronic device further comprises contact-free detection means. Contact-free detection means in this sense are any means suitable for determining second positional information in dependence of the spatial configuration of the user input object, and preferably in dependence of the spatial configuration of the user input object with regard to the touch-sensitive surface. The spatial configuration of the user input object is to be understood as the three-dimensional arrangement, location, and orientation of the user input object with regard to the touch-sensitive surface. If the user input object is, for example, a user finger, then the spatial configuration may refer to the position in (detection) space that the finger occupies. If the user input object, for example, consists of two hands, then the spatial configuration may refer to the position in (detection) space that the two hands occupy. The spatial configuration of the user input object differs from where the user input object contacts the touch-sensitive surface (first positional information) in that the user input object may remain touching the same contact area on the touch-sensitive surface while its spatial configuration changes. An example for such a situation is a user finger that touches one specific contact area on the touch-sensitive area while the hand connected to the finger moves to the left, to the right, up or down. Another example for such a situation is a one user finger that touches one specific contact area on the touch-sensitive area while another user finger within the detection space moves to the left, to the right, up or down. Thereby, the spatial configuration of the finger changes while the contact area with the touch-sensitive surface remains the same. By determining second positional information, the electronic device determines information depending on the spatial configuration of the user input object with regard to the touch-sensitive surface (and/or with regard to a predefined reference point thereon). It should be noted that the contact free detection means may only determine the spatial configuration of that portion of the user input object that lies within the detection space of the contact-free detection means. The detection space depends on the concrete design of the contact free detection means. Generally, contact-free detection means may be any means suitable for determining second positional information. Specifically, contact-free detection means may be: (1) an active contact-free 3D scanner, which emits some kind of radiation (such as light, infrared light, or radio waves) and/or mechanical wave (such as ultrasound) and detect its reflection in order to probe an object or environment; (2) a passive contact-free 3D scanner, which do not emit any kind of radiation themselves but instead rely on detecting reflected ambient radiation, wherein most scanners of this type detect visible light because it is a readily available ambient radiation and/or mechanical waves; (3) a capacitive sensing arrangement, such as an arrangement of electric field generation and detection electrodes operatively connected to an analysis module; or (4) a contact-free 3D scanner based on time-of-flight measurements, such as a time-of-flight camera. Details regarding according contact-free detection means will be described below and in particular with regard to the embodiments.

The electronic device also comprises controller means that are operatively connected to the touch-sensitive surface and to the contact-free detection means. Controller means may be any means suitable for processing the information and/or data (that may be analog or digital) obtained from the touch-sensitive surface and to the contact-free detection means. Controller means may comprise one or more controllers, processors, integrated circuits (IC), application-specific integrated circuit (ASIC), analogue-to-digital converters (ADC), and/or programmable computing machines. In particular, the controller means may comprise at least one separate controller for each of the touch-sensitive surface and the contact free detection means.

According controller means are adapted for simultaneously and/or alternately determining the first positional information via the touch-sensitive surface and the second positional information via the contact free detection means. How both the first and the second positional information are determined simultaneously and/or alternately depends on the concrete embodiment of the electronic device. If, for example, the contact-free detection means are based on at least one camera and an image analysis module, then the second positional information could be determined at the rate of image acquisition by means of the image analysis module, which is either an integral part of the controller means or a separate module that transmits said second positional information to the controller means. Simultaneously and/or alternately, the touch-sensitive detection means in combination with the controller means determines the first positional information, preferably at the same rate as the second positional information. For each time interval (the length thereof resulting from the rate of information generation), a positional information tupel comprising the first and the second positional information is generated. Alternatively, if the contact free detection means are based on an arrangement of electric field generation and detection means operatively connected to an analysis module, the second positional information may be simultaneously and/or alternately obtained by employing a multiplexing method, e.g., frequency-division-multiplexing and/or time-division-multiplexing. Such a multiplexing method may be required if the touch-sensitive surface employs a sensor technology that could interfere with such determination of the second positional information, e.g., if the touch-sensitive surface is based on capacitive sensor technology (that may even use the same electrode structures as the contact-free detection means).

This is advantageous because such an electronic device provides a user interface on the basis of a touch-sensitive surface that extends over typical two-dimensional control (i.e., with two degrees of freedom). This effect is achieved by the advantageous combination of the touch-sensitive surface with contact-free detection means, the latter introducing additional degrees of freedom by determining second positional information in dependence of the spatial configuration of the user input object, such as a user finger or a stylus. Because these detection means are contact-free, they integrate seamlessly with the touch-sensitive surface and experience no mechanical wear. In addition, they provide further degrees of freedom that are intuitive, user friendly, and easily understood by the user.

In some embodiments, the controller means are adapted for simultaneously and/or alternately determining the first positional information and the second positional information using time-division-multiplexing and/or frequency-division-multiplexing. This embodiment is advantageous if the touch-sensitive surface and the contact-free detection means would otherwise interfere with each other. This may, for example, be the case if both rely on capacitive sensor technology.

In some embodiments, the first positional information comprises a first position that depends on where the user input object contacts the touch-sensitive surface, and the second positional information comprises a second position that depends on the spatial configuration of the user input object. First and second positional information may contain a wide variety of data obtained via the touch-sensitive surface and via the contact-free detection means (including raw data). For providing the user of the electronic device with two degrees of freedom, extracting a first position that depends on where the user input object contacts the touch-sensitive surface is sufficient. For providing additional degrees of freedom, another, second position, is extracted. This second position is an easy to interpret and easy to analyze representation of the entire spatial configuration of the user input object. In particular, if the user input object is finger shaped and/or rod shaped, then the first and the second position is sufficient to determine the spatial configuration of the user input object with regard to the touch-sensitive surface with an accuracy that is adequate for user interface purposes. This embodiment accordingly is advantageous because a first and second position is easier to interpret and analyze than a more complicated set of data that could be comprised by the first and the second positional information. Computing power and memory requirements may be reduced.

In some embodiments, the first position is a mean position (preferably substantially the geometric means position) of where the user input object contacts the touch sensitive surface, preferably weighted with regard to electrical properties of the user input device. Where the user input object contacts the touch-sensitive surface is the contact area between the user input object and the touch-sensitive surface. What is to be understood as the mean position and/or the geometric mean position thereof depends on the concrete embodiment and, in particular, on the sensor technology used to determine the first positional information. In an example case, the positional information is determined by means of capacitive sensor technology. For this purpose, the active area of the touch sensitive surface is divided into segments, each segment having and/or carrying a capacitive sensor element. Accordingly, multiple capacitive sensors are arranged on the touch-sensitive surface. When the user input object (e.g., in the form of a user finger) makes contact with the touch-sensitive surface, then different changes to the electric field and thus different changes to the capacitances of the capacitive sensors are induced and measured by these capacitive sensors. From these different changes measured by capacitive sensor elements arranged at different locations on the touch-sensitive surface, the mean contact position (or the geometric mean position) is calculated and/or determined. Preferably, the first position (i.e., mean position or substantially the geometric mean position) is calculated and determined by weighting the changes induced to the capacitances of the capacitive sensors. In the latter case, the first position is determined by weighting electrical properties of the user input device.

In some embodiments, the second position is the mean position (preferably substantially the geometric mean position) of the user input object. Preferably, the second position is the mean position (preferably substantially the geometric mean position) of the user input object in the detection space of the contact-free detection means. The mean position (or the geometric mean position) of the user input object indicates a point in space that represents the spatial configuration of the user input object in the detection space. It is determined from the second positional information. In case, the contact-free detection means are based on capacitive sensor technology, the mean position (or substantially the geometric mean position) of the user input object is determined by analyzing the electrical influence of the user input object on the electric field of corresponding electrical field generation and detection electrodes. An according method is known from WO 2011/128116 A2, DE 10 2007 020 873 A1, and DE 10 2010 007 455 A1, each of which is hereby incorporated by reference. Preferably, the second position (i.e., mean position or substantially the geometric mean position) is calculated and determined by weighting the changes induced to the capacitances of capacitive sensors. In the latter case, the second position is determined by weighting electrical properties of the user input device. The second position is not necessarily a position that is occupied by the user input object. In particular, if the user input object consists of more than one part (e.g., if the user input object consists of two user fingers or two user hands), then the second position may frequently be determined to be in a position in space that is not occupied by the user input object.

In some embodiments, the first positional information is determined and/or represented in two dimensions. This embodiment is advantageous because the first positional information depends (solely) on the contact area between the user input object and the touch-sensitive surface. Any touch event can thus be described by two coordinates representing a position on the touch-sensitive surface and, if necessary, a scalar value representing a measured quantity, such as the change induced to the capacitance of a capacitive sensor element or to the resistivity of a resistive sensor element. An embodiment of such a description may be a two-dimensional scalar field. Another embodiment of such a description may be 2-tuple (also referred to as pair) representing, for example, the first position. Accordingly, the contact area information can be determined and/or represented in two dimensions.

In some embodiments, the second positional information is determined and represented in three-dimensions. This embodiment is advantageous because the second positional information depends on the spatial configuration of the user input object in three-dimensional space. Any spatial configuration of an object can be described by three coordinates and, if necessary, a scalar value. An embodiment of such a description may be a three-dimensional scalar field. Another embodiment of such a description may be a 3-tuple (also referred to as triplet) representing, for example, the second position. Accordingly, the arrangement information can be determined and/or represented by three dimensions.

In some embodiments, the first positional information is nonetheless determined and/or represented in three dimensions. This embodiment is advantageous because, for comparing or operating on both first and second positional information, no coordinate transformation must be performed.

In some embodiments, both the first positional information and the second positional information are determined and/or represented in the same coordinate system. This embodiment is advantageous because it allows for easily determining relative arrangement of coordinates and/or positions comprised by the first and the second positional information.

In some embodiments, both the first and the second position are determined and/or represented in the same coordinate system. This embodiment is advantageous because it allows for easily determining relative arrangement of the first and the second position.

In some embodiments, both the first positional information and the second positional information are determined relative to a, preferably fixed, reference position on the touch-sensitive surface. This embodiment is advantageous because it allows for easily determining relative arrangement of coordinates and/or positions comprised by the first and the second positional information with regard to a reference position on the touch-sensitive surface.

In some embodiments, both the first and the second position are determined relative to a, preferably fixed, reference position on the touch-sensitive surface. This embodiment is advantageous because it allows for easily determining relative arrangement of the first and the second position with regard to a reference position on the touch-sensitive surface.

In some embodiments, the second positional information depends on the spatial configuration of a portion of the user input object that is within a predefined distance of the touch-sensitive surface, i.e., within the detection space, wherein the predefined distance is preferably less than: 0.5 cm, 1 cm, 1.5 cm, 2 cm, 2.5 cm, 3 cm, 3.5 cm, 4 cm, 4.5 cm, 5 cm, 5.5 cm, 6 cm, 7 cm, 8 cm, 9 cm, 10 cm, 15 cm, 20 cm, 50 cm, 1 m, 2 m, 5 m, or 10 m. Generally, the user input object is either held by the user (e.g., stylus) or a part of the user's body (e.g., finger). Consequently, the contact-free detection means have to distinguish between the user input object and body parts of the user that should not serve or be regarded as a user input object. This is especially hard to achieve if the user input object is itself the user input object (e.g., finger that is part of the hand connected to the torso via the arm etc.). By reducing the detection space to a predefined distance in front of the touch-sensitive surface, only a portion of the user input object influences the second positional information determined by the contact-free detection means, namely the portion that is within the predefined distance of the touch sensitive surface. Preferably, the predefined distance may be chosen or set up depending on the geometry of the electronic device and the user input object so that (1) the portion detected and determined is sufficient to achieve convenient, user-friendly, and intuitive control with additional degrees of freedom and that (2) portions of the user that should not serve or be regarded as a user input object are not detected/determined (3) unintentional activation or deactivation of functions of the electronic device due to recognition of user body parts that should not serve as user input object are avoided/prevented.

In some embodiments, the predefined distance may be defined by the controller means and/or the contact-free detection means. In the case of contact-free detection means based on capacitive sensing, the predefined distance may depend on the geometry of the electric field generated by the electric-field-generation and -detection means and thus on geometry of the electric-field-generation and -detection means themselves.

In some embodiments, the touch-sensitive surface is a part of a touch-sensitive display. Many electronic devices (in particular small-scale, mobile devices) have a touch-sensitive display, wherein a touch-sensitive surface is a part or an integral part of a touch-sensitive display. Such a component and functionality, which is already present in prior art devices, may be employed and/or accordingly modified to construct embodiments according to the invention. This embodiment is advantageous because touch-sensitive display enables the user to interact directly with what is displayed, rather than indirectly with a pointer controlled by a separate touch-sensitive surface. Further, it lets the user do so without requiring any intermediate device.

In some embodiments, the contact-free detection means comprise a contact-free 3D scanner, which is active or passive. Active scanners emit some kind of radiation or mechanical wave and detect its reflection in order to probe an object or environment. Possible types of emissions include electromagnetic radiation, such as light, and mechanical waves, such as ultrasound. Passive scanners do not emit any kind of radiation themselves but instead rely on detecting reflected ambient radiation. Most scanners of this type detect visible light because it is a readily available ambient radiation and/or mechanical waves. Other types of radiation, such as infrared, could also be used. Passive methods may be very cheap because in most cases they do not rely on particular hardware but simple CCD cameras. Nonetheless, both active and passive scanners require a 3D sensor module. The 3D sensor module may be a stereoscopic system with two video cameras arranged slightly apart and observing the same scene. By analyzing the slight differences between the images seen by each camera, it is possible to determine the distance at each point in the images. This method is based on the same principles driving human stereoscopic vision. The 3D sensor module may also be based on silhouette techniques, which use outlines created from a sequence of photographs around a three-dimensional object against a well contrasted background.

In some embodiments, the contact-free 3D scanner comprises at least one video camera for recording images of the user input object and an image analysis module for determining the second positional information from the recorded images, wherein the image analysis module is a separate module or an integral part of the controller means.

In some embodiments, the contact-free detection means comprise: capacitive sensing means, such as electric field generation means for generating an electric field that is static or quasi-static; electric field detection means for detecting changes of the electric field caused by the user input object, wherein the electric field detection means are separate means or an integral part of the electric field generation means; an analysis module for determining the second positional information from the detected changes of the electric field, wherein the analysis module is a separate module or an integral part of the controller means. According contact-free detection means are known from WO 2011/128116 A2, DE 10 2007 020 873 A1, and DE 10 2010 007 455 A1, each of which is hereby incorporated by reference. An example embodiment thereof will be described below.

In some embodiments, the electric field generation means and/or the electric field detection means are integral part of the touch-sensitive surface and/or of the touch-sensitive display. This embodiment is advantageous because the same components may fulfill different functions for the touch-sensitive surface, the display, and the contact-free detection means. Thereby, the electronic device may be produced smaller with regard to its form, and it may be produced at lower cost.

In some embodiments, the electronic device further comprises a gesture recognition module that is a separate module or an integral part of the controller means, wherein the gesture recognition module is adapted for identifying a gesture as belonging to a predefined gesture category from: the first positional information, the second positional information, the first position, and/or the second position, or a change of such information, each of which is determined by the controller means, and wherein the electronic device is adapted for transitioning from a first state into a second state when or after a predefined gesture is identified by the gesture recognition module. The electronic device may assume a plurality of states. A state may refer to, for example, a state of a graphical user interface presented by the electronic device, to a state of an application (such as applications regarding text editing, messaging, graphic editing, emailing, music playing, or game playing), or to a locked/unlocked state. Via the user interface, the user may interact with the electronic device and make it transition from a first into a second state. One problem associated therewith is that such transitions may be called up unintentionally due to, for example, unintentional interactions with the user interface. This problem is solved by only allowing the user to interact by means of predefined gestures. Only if a predefined gesture is identified by the gesture recognition module, the electronic device transitions from a first to a second state. Another advantage of providing such a gesture recognition module is that a set of predefined gesture categories may be provided by which the user can interact with the electronic device, the gestures being especially intuitive and easy to learn for the user.

In some embodiments, the gesture recognition module is adapted for: preferably storing and/or obtaining a predefined gesture category, recording a gesture from the first and the second positional information and/or from the first and the second position determined by the controller means, wherein identifying the recorded gesture as corresponding to the predefined gesture category, preferably extracting a parameter from the identified gesture (such as a zoom factor, or a discrete rotation angle) wherein a gesture preferably is a trajectory in a phase space, the phase space being defined by all possible states of the first and the second positional information and/or of the first and the second position, i.e., by those states that the first and the second positional information and/or the first and the second position may assume.

In some embodiments, the gesture is recorded by the gesture recognition module as long as the user input object touches the touch-sensitive surface. This embodiment is advantageous because the start and end of the gesture is unambiguously defined both for the user having to perform the gesture and the gesture recognition module having to record and/or identify the gesture.

In some embodiments, a gesture belongs to the predefined category if the second position moves on a substantially circular trajectory around a rotational axis, the rotational axis being perpendicular to the touch-sensitive surface and intersecting the first position, the first position remaining substantially constant. Such a gesture may be performed by touching the touch-sensitive surface with a finger tip and moving the remaining part of the finger so that the finger describes a (part of) a lateral surface of a cone. Such a gesture may also be performed by touching the touch-sensitive surface with a finger tip of the first hand and moving a finger of the second hand so that the finger describes a circle or part thereof. The function associated with such a gesture in the electronic device could be a rotation, in particular the rotation of a 2D or 3D view around an axis pointing into the displayed view. In the latter case, the first state would be an unrotated view and the second state would be a rotated view, whereby the angle of rotation could depend on the angle traversed by moving the finger in a substantially circular motion.

In some embodiments, a gesture belongs to the predefined category if the second position moves on a trajectory, which is substantially a line, towards or away from the touch-sensitive surface, the first position remaining substantially constant, the line preferably being perpendicular to the touch-sensitive surface. Such a gesture may be performed by touching the touch-sensitive surface with a finger tip of one finger (e.g., thumb or pointer) and moving the remaining fingers (or finger tips) of the same hand or moving the fingers (or finger tips) of the other hand towards or away from the touch-sensitive surface. The function associated with such a gesture in the electronic device could be zooming, in particular zooming into or out of a 2D or 3D view. In the latter case, the first state would be an unzoomed view and the second state would be a zoomed view, whereby the zoom factor could depend on the distance traversed by moving the finger towards or away from the touch-sensitive surface.

In some embodiments, a gesture belongs to the predefined category if the second position moves on a substantially circular trajectory around a rotational axis, the rotational axis lying within the touch-sensitive surface and intersecting the first position, the first position remaining substantially constant. Such a gesture may be performed by touching the touch-sensitive surface with one finger (e.g., thumb or pointer) and moving the remaining part of the finger (and/or the entire hand) or moving the fingers (or finger tips) of the other hand on a substantially circular trajectory while keeping the one finger in contact with the touch-sensitive surface. The function associated with such a gesture in the electronic device could be, for example, another degree of freedom for a 3D control.

In some embodiments, a gesture belongs to the predefined category if the second position moves on a trajectory, which is substantially a line, in parallel to the touch-sensitive surface, the first position remaining substantially constant. Such a gesture may be performed by touching the touch-sensitive surface with a finger tip (e.g., thumb or pointer) and moving the remaining part of the finger of the same hand (and/or the entire hand) or moving the fingers (or finger tips) of the other hand on a trajectory, which is substantially a line, in parallel to the touch-sensitive surface while keeping the one finger in contact with the touch-sensitive surface. The function associated with such a gesture in the electronic device could be, for example, another degree of freedom for a 3D control.

In some embodiments, a gesture belongs to the predefined category if the first and the second position simultaneously move in substantially the same direction, wherein said same direction is substantially parallel to the touch-sensitive surface. Such a gesture may be performed by touching the touch-sensitive surface with one finger (e.g., thumb or pointer) and moving the remaining part of the finger of the same hand (and/or the entire hand) or moving the fingers (or finger tips) of the other hand with the one finger on a trajectory in parallel to the touch-sensitive surface. The function associated with such a gesture in the electronic device could be a "classic" translational movement, which may also be performed by a prior art touchpad or mouse.

It is to be noted that the electronic device not necessarily presents the first and the second state as discrete states. On the contrary, the electronic device may present and/or undergo a transition between a first and a second state by a continuous transition and/or by making multiple transitions between multiple intermediary states.

In some embodiments, the gesture recognition module is adapted for determining a vector (in particular the length of the vector, the initial point of the vector, the terminal point of the vector, the angle between the screen surface and the vector, the angle between the vector projected onto the touch-sensitive surface and a preferred axis lying within the touch sensitive surface), wherein the initial point of the vector is the first position and the terminal point of the vector is the second position.

In some embodiments, the gesture recognition module is adapted for determining the second position in a cylindrical coordinates system and/or transforming the second position into a cylindrical coordinates system, wherein the origin of the cylindrical coordinates system is the first position, wherein the height axis is perpendicular to the touch-sensitive surface, and wherein the reference axis lies within the touch sensitive surface. This embodiment is advantageous if the predefined gesture (or one of the predefined gestures) can be identified from changes to only one of the degrees of freedom defined by the cylindrical coordinate system (i.e., height, azimuth, and radius).

In some embodiments, each degree of freedom of this cylindrical coordinate system is associated with a predefined gesture category. This embodiment is advantageous because it allows easy recognition of gestures belonging to one of the predefined gesture categories associated with one of the degrees of freedom of this cylindrical coordinate system. In some embodiments, a gesture may be decomposed into multiple gestures according to the degrees of freedoms of this cylindrical coordinate system, each of these degrees of freedom belonging to another predefine gesture category.

According to another aspect of the invention, a method for controlling an electronic device according to one of the above-described embodiments comprises the step of simultaneously and/or alternately determining the first positional information via the touch-sensitive display and the second positional information via the contact free detection means.

In some embodiments, the step of simultaneously and/or alternately determining the first position and the second position is based on a time-division-multiplexing method and/or a frequency-division-multiplexing method.

According to another aspect of the invention, a method for controlling an electronic device according to one of the above-described embodiments comprises: determining the first positional information and the second positional information while the electronic device is in a first state; recording a gesture, transitioning the electronic device to a second state if the detected gesture corresponds to a predefined gesture; and maintaining the device in the first state if the detected phase space trajectory does not correspond to the predefined gesture.

According to another aspect of the invention, a computer program product for use in conjunction with an electronic device according to one of the above described embodiments with an executable computer program mechanism embedded therein, the executable computer program mechanism comprising instructions for: simultaneously and/or alternately determining the first positional information via the touch-sensitive display and the second positional information via the contact free detection means, wherein the step of simultaneously and/or alternately determining the first position and the second position may be based on a time-division-multiplexing method and/or a frequency-division-multiplexing method.

According to another aspect of the invention, a computer program product for use in conjunction with an electronic device according to one of the above described embodiments with an executable computer program mechanism embedded therein, the executable computer program mechanism comprising instructions for: determining the first positional information and the second positional information while the electronic device is in a first state; recording a gesture, transitioning the electronic device to a second state if the detected gesture belongs to a predefined gesture category; and maintaining the device in the first state if the detected phase space trajectory does not belong to a predefined gesture category, wherein the gesture may be recorded as long as the user input object touches the touch-sensitive surface, and wherein In some embodiments, the executable computer program mechanism further comprises instructions for: extracting a parameter from the identified gesture, such as a zoom factor, or a discrete rotation angle.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
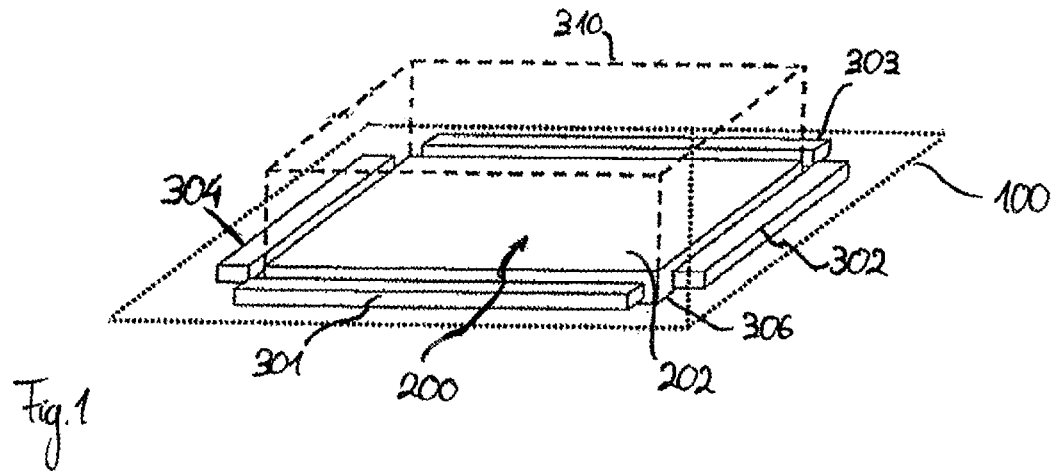
FIG. 1 is an isometric view of a general schematic representation of an electronic device with a touch-sensitive surface and contact-free detection means according to some embodiments of the invention.
Figure 2:
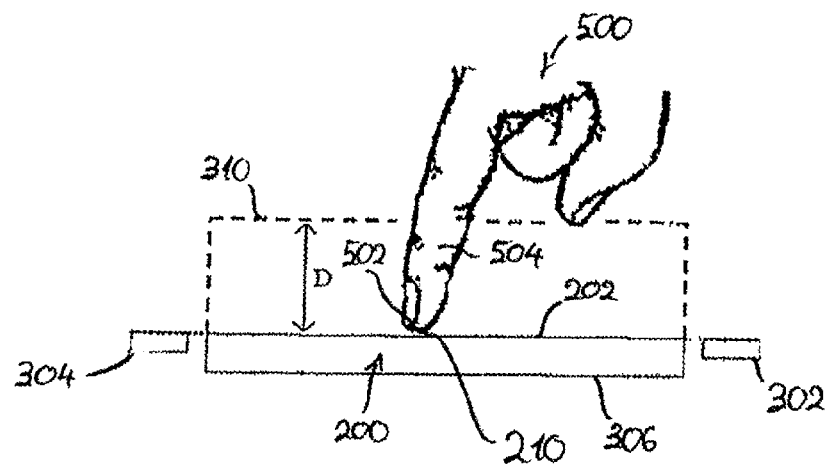
FIG. 2 is a cross sectional view of the general schematic representation of an electronic device with a touch-sensitive surface and contact-free detection means according to some embodiments of the invention.

FIG. 1 is a general schematic representation of an electronic device 100 that is adapted for determining a first positional information and a second positional information regarding a user input object 500. The electronic device is a tablet computer 100 but could be any electronic device that is itself a user interface or comprises a user interface, such as a mobile phone, mp3 player, PDA, tablet computer, computer, remote control, radio, computer mouse, touch-sensitive display, and television. The user input object 500 is shown as user finger 500, but may be anything like a stylus (e.g., a small pen-shaped instrument), or a digital pen.

The electronic device 100 comprises a touch-sensitive surface 200 that serves as a user-interface by being suitable for detecting a user input object 500 that touches an active area 202 of the touch-sensitive surface 200. Thereby, the touch-sensitive surface 200 not only detects that a user input object 500 touches its active area 202; rather, it also detects where the user input object 500 makes contact with the active area, i.e., the touch-sensitive display extracts the x- and y-coordinates of the contact area (for example, the weighted geometric mean position or, if the active area is divided into sensor segments, all sensor segments that are contacted) between the touch-sensitive surface 200 and said user input object 500. Thereby the touch-sensitive surface 200 determines the first positional information, the first positional information solely depending on where the user input object 500 contacts the touch-sensitive surface 200. In this embodiment, the touch sensitive surface is based on capacitive sensor technology, wherein the active area 202 of the touch-sensitive surface 200 is divided into segments, each segment comprising a capacitive sensor element 204; however, a wide variety of different sensor technologies could just as well form the basis of touch-sensitive surface 200, for example: resistive, capacitive (e.g., surface capacitive projected capacitive, mutual capacitive, self capacitive), surface acoustic wave, infrared, optical imaging, dispersive signal, and acoustic pulse recognition sensor technology. In this embodiment, the touch sensitive surface 200 is a touch-sensitive display 200, which is suitable for displaying information generated by the electronic device 100.

The electronic device 100 further comprises contact-free detection means 300. In general, contact-free detection means 300 in this sense are any means suitable for determining second positional information depending on the spatial configuration of the user input object 500 with regard to the touch-sensitive surface 200. The spatial configuration of the user input object 500 is to be understood as the three-dimensional arrangement, location, and orientation of the user input object 500 with regard to the touch-sensitive surface 200. The user input object 500 is, as shown in the figures, a user finger 500; therefore, the spatial configuration refers to the space that the finger 500 occupies. While the user input object 500 may remain touching the same contact area 210 on the touch-sensitive surface 200, its spatial configuration may change. A concrete example is a user finger 500 that touches one specific contact area on the touch-sensitive area while the hand connected to the finger 500 moves to the left, to the right, up or down. Thereby, the spatial configuration of the finger 500 changes while the contact area 210 with the touch-sensitive surface 202 remains the same. By determining second positional information, the electronic device 100 determines information depending on the spatial configuration of the user input object with regard to the touch-sensitive surface 200 (and/or with regard to a predefined reference point thereon). Specifically, the contact-free detection means 300 are based on capacitive sensing by means of a plurality of electrodes. FIG. 1 schematically shows an according arrangement of a ground electrode 306 and four electric-field-generation and -detection electrodes 301, 302, 303, 304. Here, the four electric-field-generation-generation and -detection electrodes 301, 302, 303, 304 are shown as separate units while the ground electrode 306 is shown as a part of the touch-sensitive surface 200. However, each of the electric-field-generation and -detection electrodes 301, 302, 303, 304 and the ground electrode 306 may be either a part of the touch-sensitive surface 200 or a separate entity. At least each of the electric-field-generation and -detection electrodes 301, 302, 303, 304 is operatively connected to a contact-free-detection controller 124. Preferably, the ground electrode 306 is also operatively connected to a contact-free-detection controller 124. The ground electrode may, for example, be a VCOM electrode of the touch-sensitive display comprising the touch-sensitive surface 200. The contact-free detection means 300 in the form of a capacitive sensing system may be operated in two modes, namely: (1) in the mutual capacitance mode, where the user input object 500 alters the mutual coupling between the four electric field generation and detection electrodes 301, 302, 303, 304, wherein each electrode is scanned sequentially against each of the other electrodes; and, (2) in the self- or absolute capacitance mode, where the user input object 500 loads the electric field generation and detection electrodes 301, 302, 303, 304 or increases the parasitic capacitance to ground. Further embodiments regarding such contact-free detection means 300 will be described below.

The electronic device 100 also comprises controller means that are operatively connected to the touch-sensitive surface 200 and to the contact-free detection means 300. Controller means may be any means suitable for processing the information and/or data (that may be analog or digital) obtained from the touch-sensitive surface and from the contact-free detection means. Controller means may comprise one or more controllers, processors, integrated circuits (IC), application-specific integrated circuit (ASIC), analogue-to-digital converters (ADC), and/or programmable computing machines. In this specific embodiment, the controller means comprise an I/O subsystem 120 with at least two controllers: a touch-sensitive surface controller 122 and the contact-free detection means controller 124 already mentioned above. Both controllers are embodied as application-specific integrated circuits (ASICs). In some embodiments, those two controllers are embodied as a single ASIC.

According controller means 120 are adapted for simultaneously and/or alternately determining the first positional information via the touch-sensitive surface and the second positional information via the contact free detection means 300. How both the first and the second positional information are determined simultaneously and/or alternately depends on the concrete embodiment of the electronic device 100. Here, both the contact free detection means 300 and the touch-sensitive surface 200 are based on capacitive sensing. The problem may arise that their measurements interfere with each other. To solve the interference problem or prevent that such a problem may arise, a multiplexing method is employed. In some embodiments presently discussed, both frequency-division-multiplexing as well as time-division-multiplexing is implemented. For time-division-multiplexing, time is divided into intervals, wherein, in two consecutive time intervals, the first positional information is determined via the touch-sensitive surface 200 in one of the two time intervals, and the second positional information is determined via the contact-free detection means in the other of the two time intervals. Each time interval may be in the order of milliseconds. Each time interval may be less than 100 ms, 10 ms, 1 ms, or 0.1 ms. Time-division-multiplexing allows for alternately determining the first and the second positional information so that, at any given point in time, both up-to-date first and second positional information is available in the electronic device 100. For frequency-division-multiplexing, non-overlapping frequency ranges are assigned to the touch-sensitive surface 200 and the contact-free detection means 300 for generating and detecting electric fields (and thus for capacitive sensing). In this way, the same media (space in front of the touch-sensitive surface and/or commonly used electrode(s)) may be used by both the touch-sensitive surface 200 and the contact-free detection means 300. Consequently, frequency-division-multiplexing allows for simultaneously determining the first and the second positional information so that, at any given point in time, both up-to-date first and second positional information is available in the electronic device 100.

In some embodiments presently discussed, the first positional information comprises a first position that depends on where the user input object contacts the touch-sensitive surface, and the second positional information comprises a second position that depends on the spatial configuration of a portion of the user input object that is within a predefined distance of the touch-sensitive surface, wherein the predefined distance D is less than 3 cm. The space defined by the touch-sensitive surface and the predefined distance is shown as cuboid 310. The predefined distance is defined by the controller means 120 and the contact-free detection means 300. In particular, the predefined distance is defined by the geometry of the electric field generated by the electric-field-generation and -detection electrodes 301, 302, 303, 304 and, if applicable, the ground electrode 306 and thus on the geometry of these electrodes themselves.

In some embodiments presently discussed, the first position is substantially the geometric mean position of where the user input object 500 contacts the touch sensitive surface 200. The geometric mean position is calculated by weighting the change in capacitance induced by the user input object 500 at each capacitive sensor element 204 of the surface. Where the user input object 500 contacts the touch-sensitive surface 200 is the contact area 210 between the user input object and the touch-sensitive surface. Here, the positional information is determined by means of capacitive sensor technology. Multiple capacitive sensors elements 204 are arranged on the touch-sensitive surface 200. The user input object 500 (e.g., in the form of a user finger) makes contact with the touch-sensitive surface 200. Then, different changes in the electric field of the capacitive sensor elements 204 are induced and measured by capacitive sensor elements 204. From these different changes measured by capacitive sensor elements 204 arranged at different locations on the touch-sensitive surface 200, the geometric mean contact position is calculated and/or determined. For this purpose, a map may be created indicating the location of all capacitive sensor elements 204 and indicating the changes in capacitance induced by the user input object 500 at each sensor element 204. The geometric mean position may be calculated by determining the geometric mean, i.e. the mean position of all positions where a capacitance change was observed. The geometric mean position may also be calculated by determining the geometric mean weighted by the magnitude of capacitance changes.

In some embodiments presently discussed, the second position is substantially the geometric mean position of a portion of the user input object 500 that is within the predefined distance D of the touch sensitive surface 200 weighted by the electrical properties of the user input device 500. However, the mean position of the user input object 500 may also merely indicate a point in space that is representative of the spatial configuration of the user input object 500. Regardless of what the second position represents, it must be determined from the second positional information. Here, the contact-free detection means are based on capacitive sensor technology, the mean position of the user input object 500 is determined by analyzing the electrical influence of the user input object on the electric field of corresponding electrical field generation and detection electrodes. An according method is known from WO 2011/128116 A2, DE 10 2007 020 873 A1, and DE 10 2010 007 455 A1, each of which is hereby incorporated by reference.

In some embodiments presently discussed, the first positional information is determined and represented in two dimensions because the first positional information depends (solely) on the contact area 210 between the user input object 500 and the touch-sensitive surface 200. Any touch event is described by two coordinates representing a position on the touch-sensitive surface. In some embodiments presently discussed, the first positional information comprises the first position in the form of a 2-tuple.

In some embodiments presently discussed, the second positional information is determined and represented in three dimensions because the second positional information depends on the spatial configuration of the user input object in three-dimensional space. Any spatial configuration of an object can be described by three coordinates and, if necessary, a scalar value. A preferable embodiment of such a description is a three-dimensional scalar field. Another preferable embodiment of such a description would be 3-tuple (also referred to as triplet) representing, for example, the second position. In some embodiments presently discussed, the second positional information comprises the second position in the form of a 3-tuple.

In some embodiments presently discussed, both the first positional information and the second positional information are preferably determined and/or represented in the same coordinate system. For this purpose, the first positional information is transformed into the coordinate system of the second positional information. Likewise the second positional information could be transformed into the coordinate system of the first positional information, or both first and second positional information could be transformed into another coordinate system.

In some embodiments presently discussed, both the first positional information, the second positional information, the first, and the second position are determined relative to a fixed reference position on the touch-sensitive surface 200.

In some embodiments presently discussed, the electronic device 100 further comprises a gesture recognition module 138 that is a separate software module in the memory 102 of the electronic device 100. The gesture recognition module 138 is adapted for identifying a gesture as belonging to a predefined gesture category from the first and the second position determined by the controller means 120. The electronic device 100 is adapted for transitioning from a first state into a second state when or after a predefined gesture is identified by the gesture recognition module 138. The electronic device 100 may assume a plurality of states. A state refers to, for example, a state of a graphical user interface presented by the electronic device, to a state of an application (such as applications regarding text editing, messaging, graphic editing, emailing, music playing, or game playing), or to locked state. Via the user interface, the user may interact with the electronic device and make it transition from a first into a second state.

In some embodiments presently discussed, the gesture recognition module is adapted for: storing and/or obtaining multiple predefined gesture category, recording a gesture from: the first position and the second position determined by the controller means 120, wherein identifying the recorded gesture as belonging to at least one of the multiple predefined gesture categories, extracting a parameter from the identified gesture, such as a zoom factor, or a discrete rotation angle, wherein a gesture is a trajectory in a phase space, the phase space being defined by all possible states of the first and the second positional information and/or of the first and the second position, i.e., by those states that the first and the second positional information and/or the first and the second position may assume.

In some embodiments presently discussed, the gesture is recorded by the gesture recognition module 138 as long as the user input object touches the touch-sensitive surface 200. This is advantageous because the start and end of the gesture is unambiguously defined both for the user performing the gesture and the gesture recognition module 138 recording the gesture.

Figure 3:
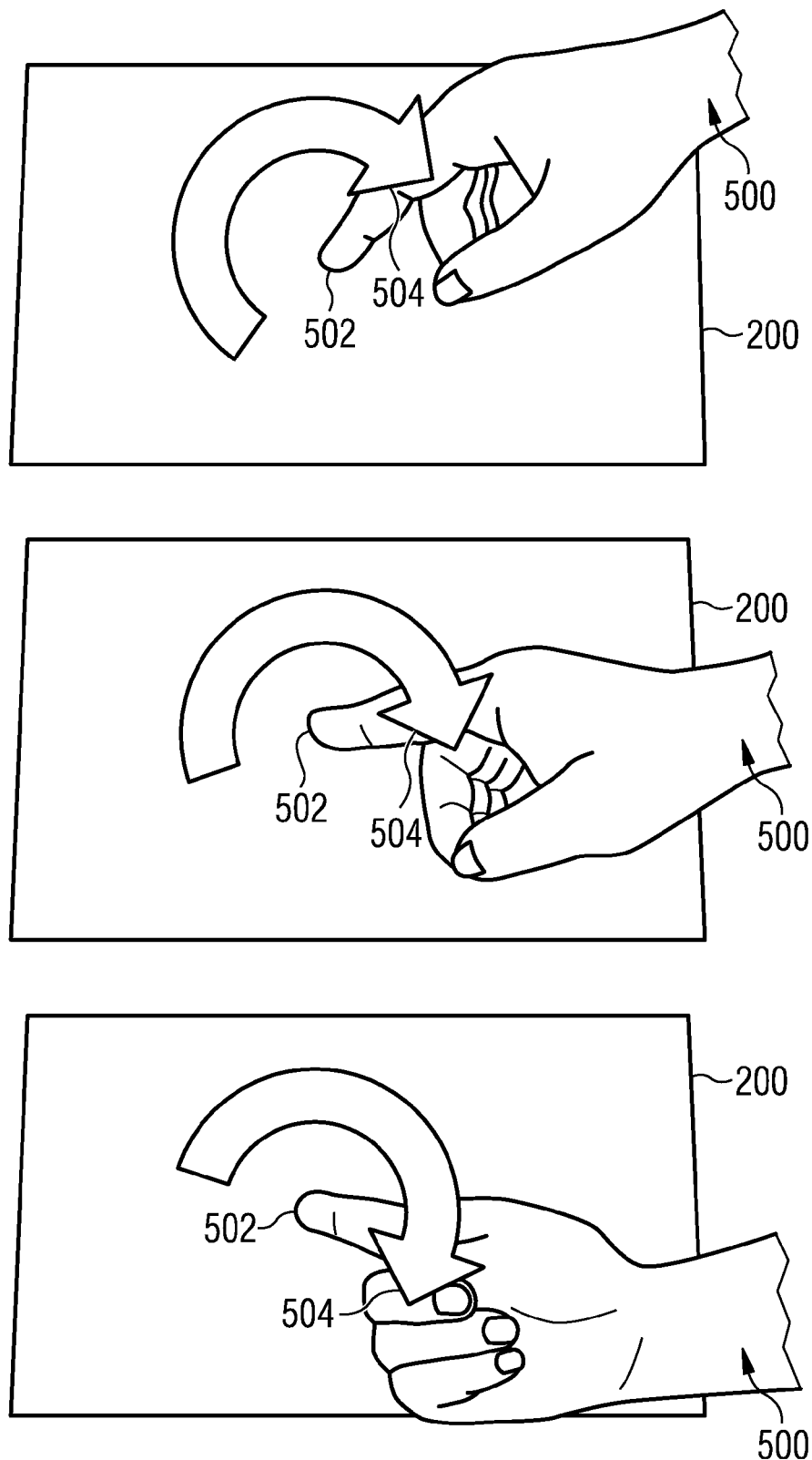
FIG. 3 is schematic view of a gesture belonging to a first predefined gesture category according to some embodiments of the invention.

In some embodiments presently discussed, a gesture belongs to a first predefined category if the second position moves on a substantially circular trajectory around a rotational axis, the rotational axis being perpendicular to the touch-sensitive surface and intersecting the first position, the first position remaining substantially constant. FIG. 3 shows that such a gesture may be performed by touching the touch-sensitive surface with a finger tip 502 and moving the remaining part of the finger 504 so that the finger describes a (part of) a cone. The function associated with such a gesture in the electronic device 100 could be a rotation, in particular the rotation of a 2D or 3D view around an axis pointing into the displayed view. In the latter case, the first state would be an unrotated view and the second state would be a rotated view, whereby the angle of rotation could depend on the angle traversed by moving the finger in a substantially circular motion.

Figure 4:
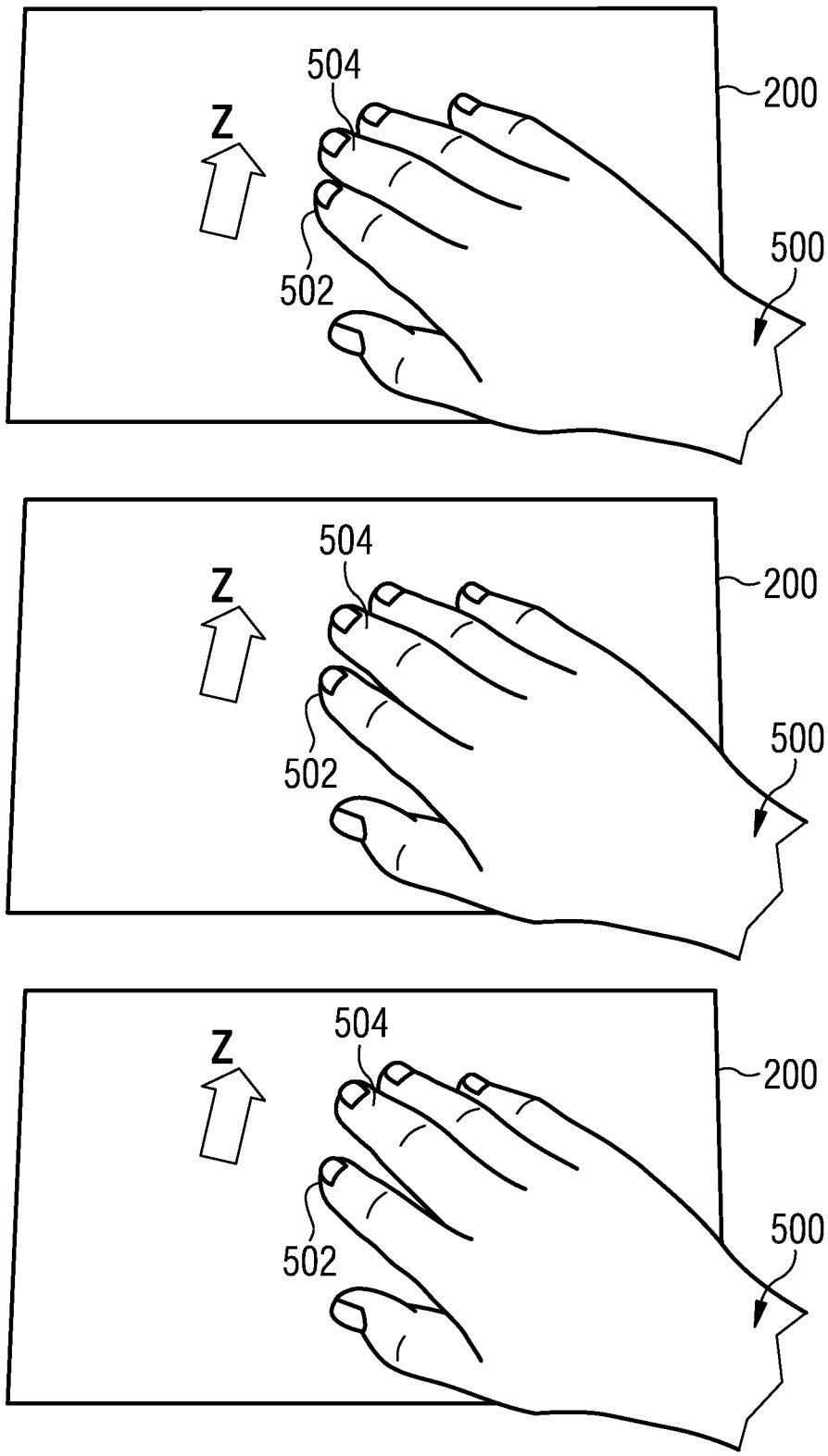
FIG. 4 is schematic view of a gesture belonging to a second predefined gesture category according to some embodiments of the invention.

In some embodiments presently discussed, a gesture belongs to a second predefined category if the second position moves on a trajectory, which is substantially a line, towards or away from the touch-sensitive surface, the first position remaining substantially constant, the line preferably being perpendicular to the touch-sensitive surface. FIG. 4 shows that such a gesture may be performed by touching the touch-sensitive surface with one finger tip 502 and moving the remaining fingers 504 towards or away from the touch-sensitive surface. The function associated with such a gesture in the electronic device 100 could be zooming, in particular zooming into or out of a 2D or 3D view. In the latter case, the first state would be an unzoomed view and the second state would be a zoomed view, whereby the zoom factor could depend on the distance traversed by moving the finger towards or away from the touch-sensitive surface 200.

In some embodiments presently discussed, a gesture belongs to a third predefined category if the second position moves on a substantially circular trajectory around a rotational axis, the rotational axis lying within the touch-sensitive surface and intersecting the first position, the first position remaining substantially constant. Such a gesture may be performed by touching the touch-sensitive surface 200 with a finger tip (e.g., thumb or pointer) and moving the remaining part of the finger on a substantially circular trajectory while keeping the one finger at rest. The function associated with such a gesture in the electronic device 100 could be, for example, another degree of freedom for a 3D control.

Figure 5:
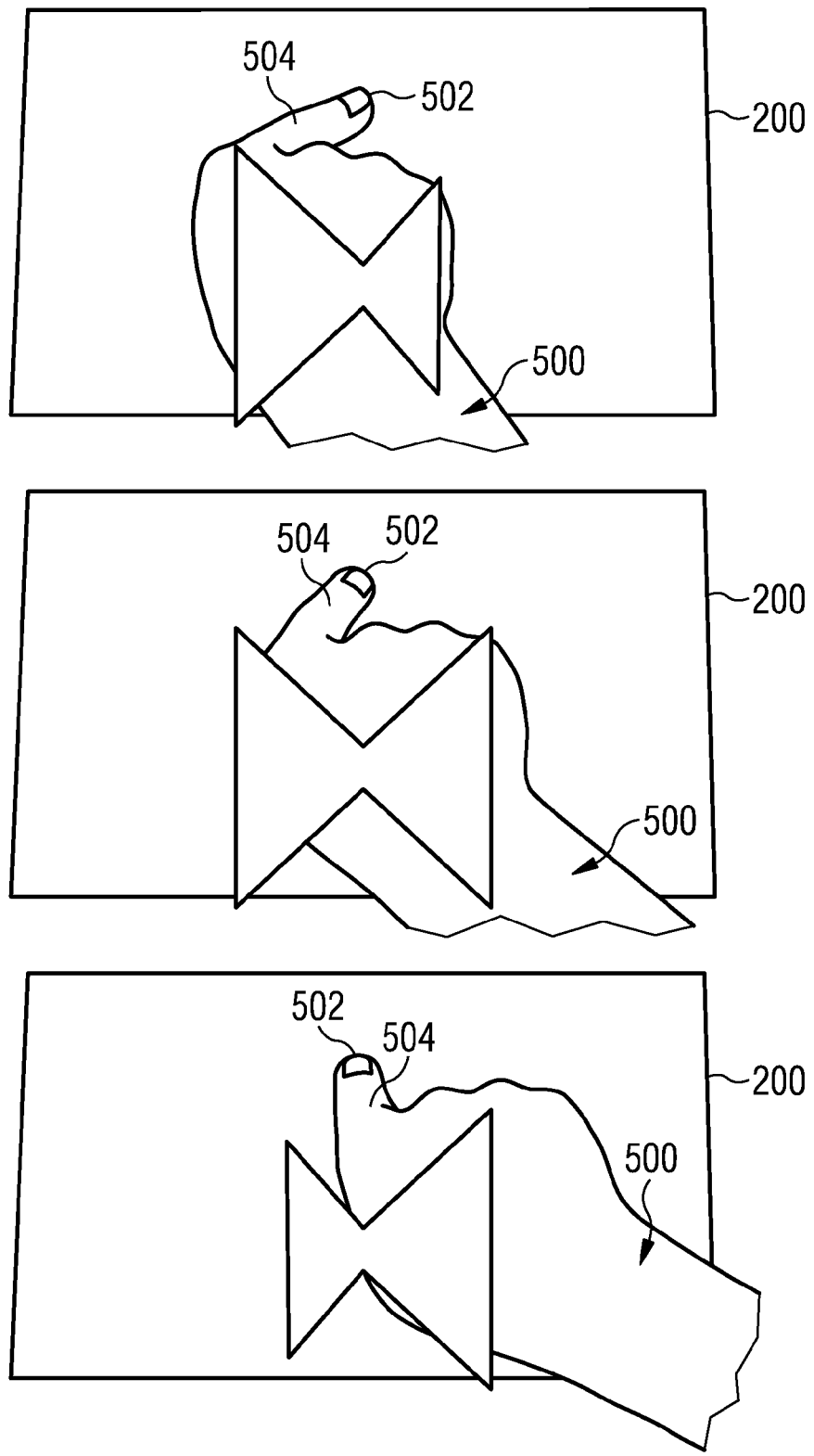
FIG. 5 is schematic view of a gesture belonging to a third predefined gesture category according to some embodiments of the invention.

In some embodiments presently discussed, a gesture belongs to a fourth predefined category if the second position moves on a trajectory, which is substantially a line, in parallel to the touch-sensitive surface, the first position remaining substantially constant. FIG. 5 shows that such a gesture may be performed by touching the touch-sensitive surface 200 with a finger tip 502 and moving the remaining part of the finger 504 on a trajectory, which is substantially a line, in parallel to the touch-sensitive surface while keeping the one finger at rest. The function associated with such a gesture in the electronic device 100 could be, for example, another degree of freedom for a 3D control.

Figure 6:
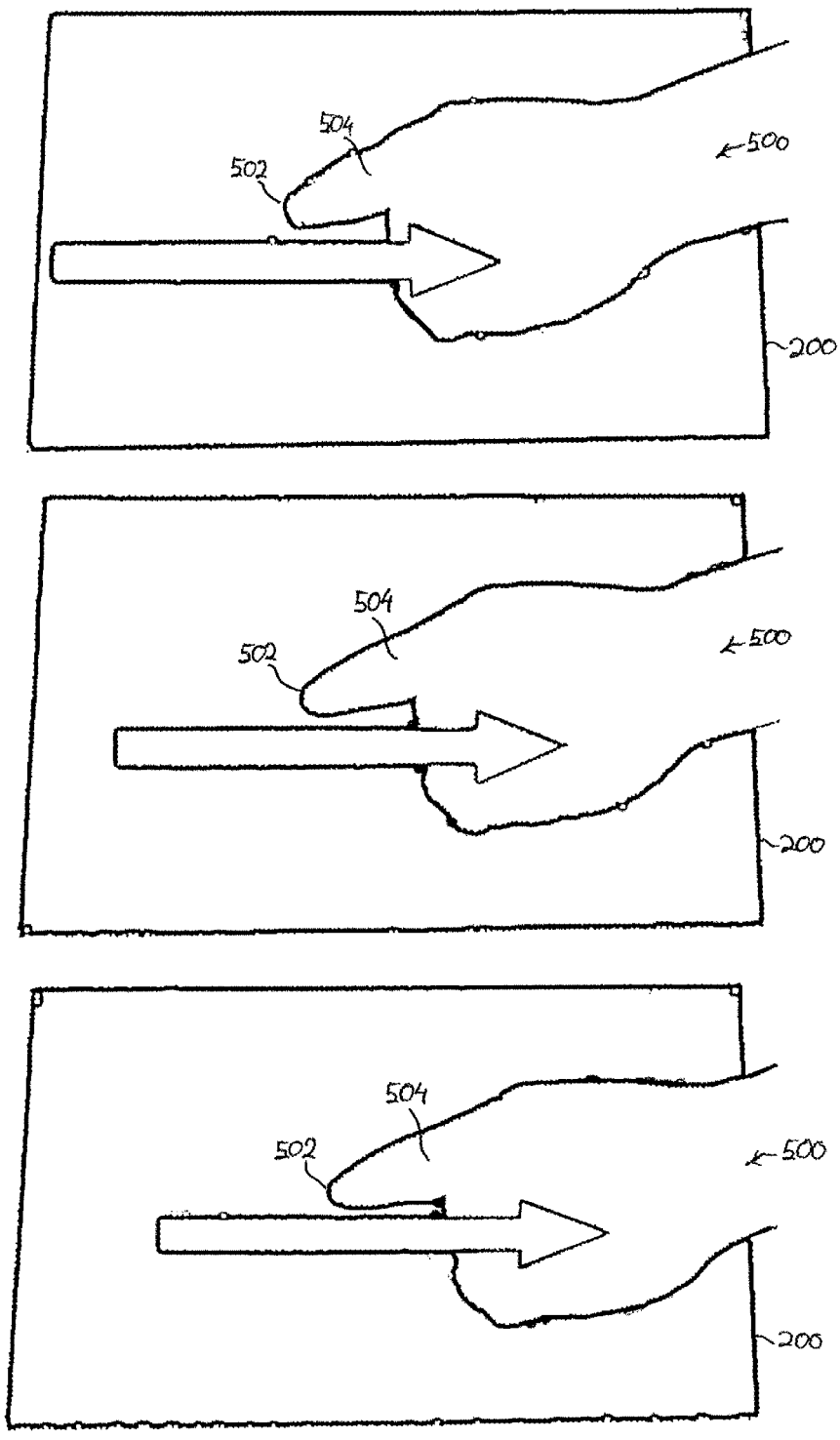
FIG. 6 is schematic view of a gesture belonging to a fourth predefined gesture category according to some embodiments of the invention.

In some embodiments presently discussed, a gesture belongs to a fifth predefined category if the first and the second position simultaneously move in substantially the same direction, wherein said same direction is substantially parallel to the touch-sensitive surface. FIG. 6 shows that such a gesture may be performed by touching the touch-sensitive surface 200 with a finger tip 502 (e.g., thumb or pointer) and moving the entire hand 500 together with the finger tip and the remaining part of the finger 504 on a trajectory in parallel to the touch-sensitive surface 200. The function associated with such a gesture in the electronic device 100 could be a "classic" translational movement, which may also be performed by a prior art touchpad or mouse.

In some embodiments presently discussed, the gesture recognition module is adapted for determining a vector (in particular the length of the vector, the initial point of the vector, the terminal point of the vector, the angle between the screen surface and the vector, the angle between the vector projected onto the touch-sensitive surface and a preferred axis lying within the touch sensitive surface), wherein the initial point of the vector is the first position and the terminal point of the vector is the second position.

In some embodiments presently discussed, the gesture recognition module 138 is adapted for determining the second position in a cylindrical coordinates system and/or transforming the second position into a cylindrical coordinates system, wherein the origin of the cylindrical coordinates system is the first position, wherein the height axis is perpendicular to the touch-sensitive surface, and wherein the reference axis lies within the touch sensitive surface. This embodiment is advantageous if the gesture (or one of the predefined gestures) can be identified from changes in only one of the degrees of freedom defined by the cylindrical coordinate system (i.e., height, azimuth, and radius).

A method for controlling an electronic device 100 according to one of the above-described embodiments comprises the step of simultaneously and/or alternately determining the first positional information via the touch-sensitive display 200 and the second positional information via the contact free detection means.

In some embodiments presently discussed, the step of simultaneously and/or alternately determining the first position and the second position is based on a time-division-multiplexing.

In some embodiments presently discussed, the method for controlling an electronic device 100 according to one of the above-described embodiments comprises: determining the first positional information and the second positional information while the electronic device is in a first state; recording a gesture, transitioning the electronic device to a second state if the detected gesture corresponds to a predefined gesture; and maintaining the device in the first state if the detected phase space trajectory does not correspond to the predefined gesture.

Example Electronic Device 100

Figure 7:
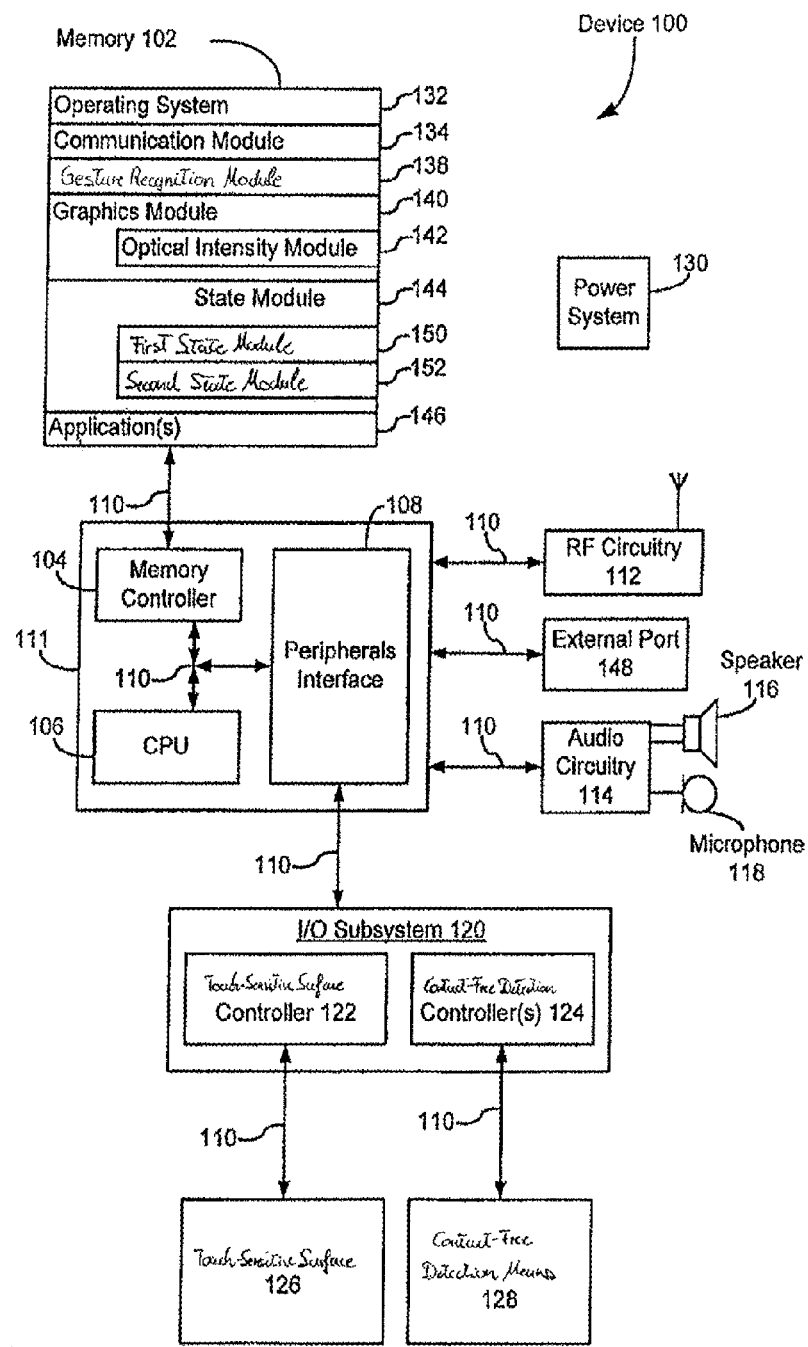
FIG. 7 is a block diagram illustrating an example electronic device, which is in accordance with some embodiments of the invention.

FIG. 7 is a more detailed schematic representation of an example electronic device 100. In this example, which is not to be considered as limiting the invention to the precise forms disclosed, the device 100 includes a memory 102, a memory controller 104, one or more processing modules (CPU's) 106, a peripherals interface 108, RF circuitry 112, audio circuitry 114, a speaker 116, a microphone 118, an input/output (I/O) subsystem 120, a touch-sensitive display 126, contact-free detection means 128, and an external port 148. These components communicate over the one or more communication buses or signal lines 110. The device 100 can be any electronic device, including but not limited to a handheld computer, a tablet computer, a mobile phone, a media player, a personal digital assistant (PDA), or the like, including a combination of two or more of these items. It should be appreciated that the device 100 is only one example of an electronic device 100, and that the device 100 may have more or fewer components than shown, or a different configuration of components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. The memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

The peripherals interface 108, the CPU 106, and the memory controller 104 may be implemented on a single chip, such as a chip 111. They may be implemented on separate chips.

The RF (radio frequency) circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 116 from sound waves. The audio circuitry 114 converts the electrical signal to audio data and transmits the audio data to the peripherals interface 108 for processing. Audio data may be may be retrieved from and/or transmitted to the memory 102 and/or the RF circuitry 112 by the peripherals interface 108. The audio circuitry 114 may also include a headset jack (not shown). The headset jack provides an interface between the audio circuitry 114 and removable audio input/output peripherals, such as output-only headphones or a headset with both output (headphone for one or both ears) and input (microphone).

Controller means in the form of the I/O subsystem 120 provide the interface between input/output peripherals on the device 100, such as the touch-sensitive display 126 and the contact-free detection means 128. The I/O subsystem 120 includes a touch-sensitive-display controller 122 and a contact-free detection means controller 124.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components may include an operating system 132, a communication module (or set of instructions) 134, a gesture recognition module (or set of instructions) 138, a graphics module (or set of instructions) 140, a user interface state module (or set of instructions) 144, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The gesture recognition module 138 is adapted to receive first and second positional information, in particular the first and the second position, from the (I/O) subsystem 120. The gesture recognition module 138 includes various software components for performing various operations related to analyzing the first and second positional information, in particular the first and the second position, such as determining if contact has occurred, determining if there is movement of the first and the second position and tracking said movement, and determining if the contact has been broken (i.e., if the contact has ceased). Determining movement may include determining speed (magnitude), velocity (magnitude and direction), and/or an acceleration (including magnitude and/or direction) of the first and the second position.

The graphics module 140 includes various known software components for rendering and displaying graphics on the touch-sensitive display 126. Note that the term "graphics" includes any object that can be displayed to a user, including without limitation text, web pages, icons (such as user-interface objects including soft keys), digital images, videos, animations and the like.

The electronic device state module 144 controls the electronic device state of the device 100. The electronic device state module 144 may include a first state module 150 and a second state module 152. The first state module detects satisfaction of any of one or more conditions to transition the device 100 to a first state and to transition the device 100 to the first state. The second state module detects satisfaction of any of one or more conditions to transition the device to an electronic device second state and to transition the device 100 to the second state.

The one or more applications 130 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

Example Touch-Sensitive Surface 200 and Contact-Free Detection Means 300

FIGS. 8 to 14 provide a more detailed schematic representation of an example embodiment of contact-free detection means 300 that are an integral part of the touch-sensitive surface 200 in the form of a touch-sensitive display 200. This touch sensitive display allows for detecting first positional information and second positional information simultaneously and/or alternately, wherein this touch-sensitive display is characterized by a robust and low-cost design.

Figure 8:
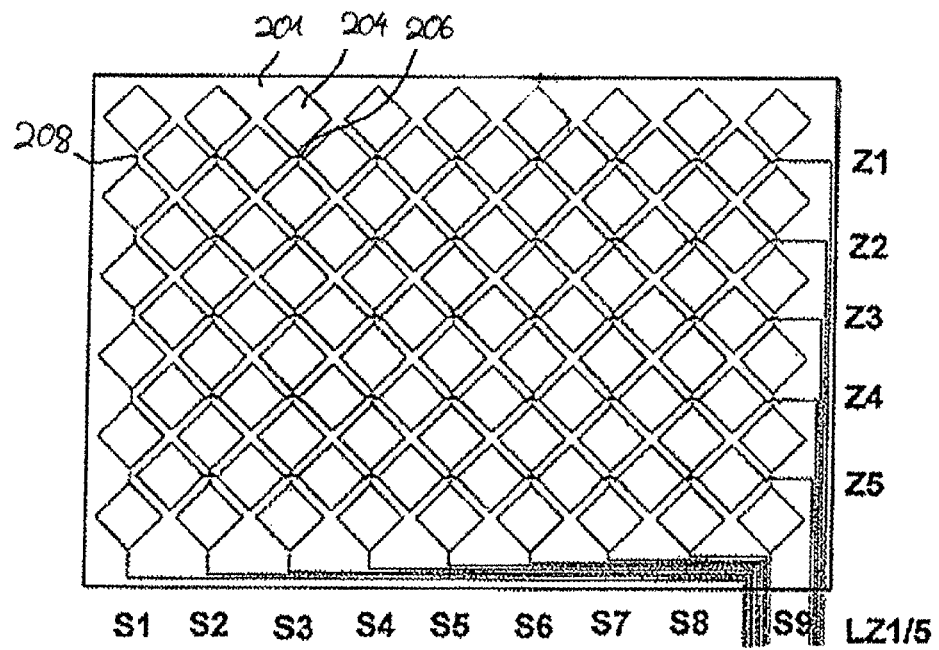
FIG. 8 is a top view of a general schematic representation of a touch-sensitive display combined with contact-free detection means, which is in accordance with some embodiments of the invention.

FIG. 8 shows a simplified a touch-sensitive display 200 combined with contact-detection means 300, which comprises: a screen layer 201 that consists of a transparent and isolating material. On this screen layer 201, a transparent electrode lays is arranged that is connected to the screen layer. This electrode layer is divided into multiple electrode segments 204, wherein an electrode segment 204 is a capacitive sensor element 204. The entirety of all electrode segments 204 forms the here-shown active area 202 in the form of segment array 202. This segment array 202 forms segment lines Z1, Z2, Z3, Z4, and Z5, as well as segment columns S1, S2 . . . S9, namely due to the fact that the corresponding horizontal and/or vertical consecutive neighboring electrode segments 204 are connected to each other by small conductive sections 206, 208. The segment lines Z1 . . . Z5 and the segment columns S1 . . . S9 are isolated with regard to each other, each of them being connected to a supply line LZ1/5 and LS1/9. The conductive sections 206, 208 are—insofar as they intersect each other in the area 202 of the touch-sensitive display 200—isolated against each other.

The segment columns and segment lines are connected to controller means 120, in particular the contact-free detection controller 124, via these supply connections LZ1/5 and LS1/9. These controller means 120, 124 are designed so that they simultaneously (by means of frequency-division-multiplexing) and alternately (by means of time-division-multiplexing) may determine first and second positional information regarding a user input object 500, wherein the contact-free detection is preformed by combining multiple electrode segments 204 of the segment array 202 to electrode groups 301, 302, 304, 304, in particular electrode line Z1 . . . Z5 or electrode column S1 . . . S9.

Figure 9:
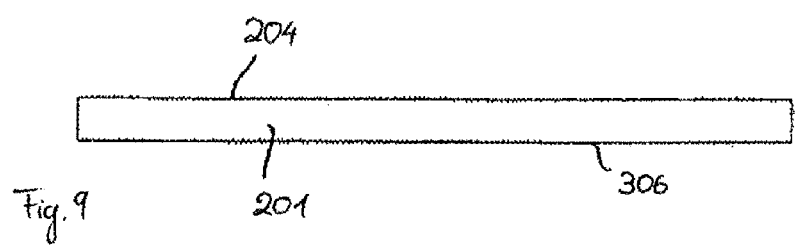
FIG. 9 is a side view of a general schematic representation of a touch-sensitive display combined with contact-free detection means, which is in accordance with some embodiments of the invention.

In FIG. 9, the design of the glass 201 of a touch-sensitive display is schematically shown as a simplified example. The screen layer 201 preferably consists of plastic or glass material and has thickness of, for example, 0.8 mm. On both sides of the screen layer 201, a transparent conductive layer 204, 306 (e.g., ITO layer) is provided.

The top surface oriented towards the user in a use position has a layer 204 that is structured and thereby divided into a plurality of segments 204, the layer hereby having closely neighbored segments 204 (e.g., rhombi) that are grouped into lines and columns. Electrically contacting the electrode segments 204 grouped into rows and columns is performed via a dedicated supply lines. The bottom side (oriented towards the display) is continuously coated with a transparent ITO layer 306. The accordingly-constructed screen layer 1 is arranged in front of a suitable display in order to provide this display with known touch-sensitive display functionality. Each of the electrode layers 204, 306 may be covered by further (here not shown) isolating transparent layers. Therefore, the electrode layers 204, 306 cannot directly be contacted in a galvanic manner.

Figure 10:
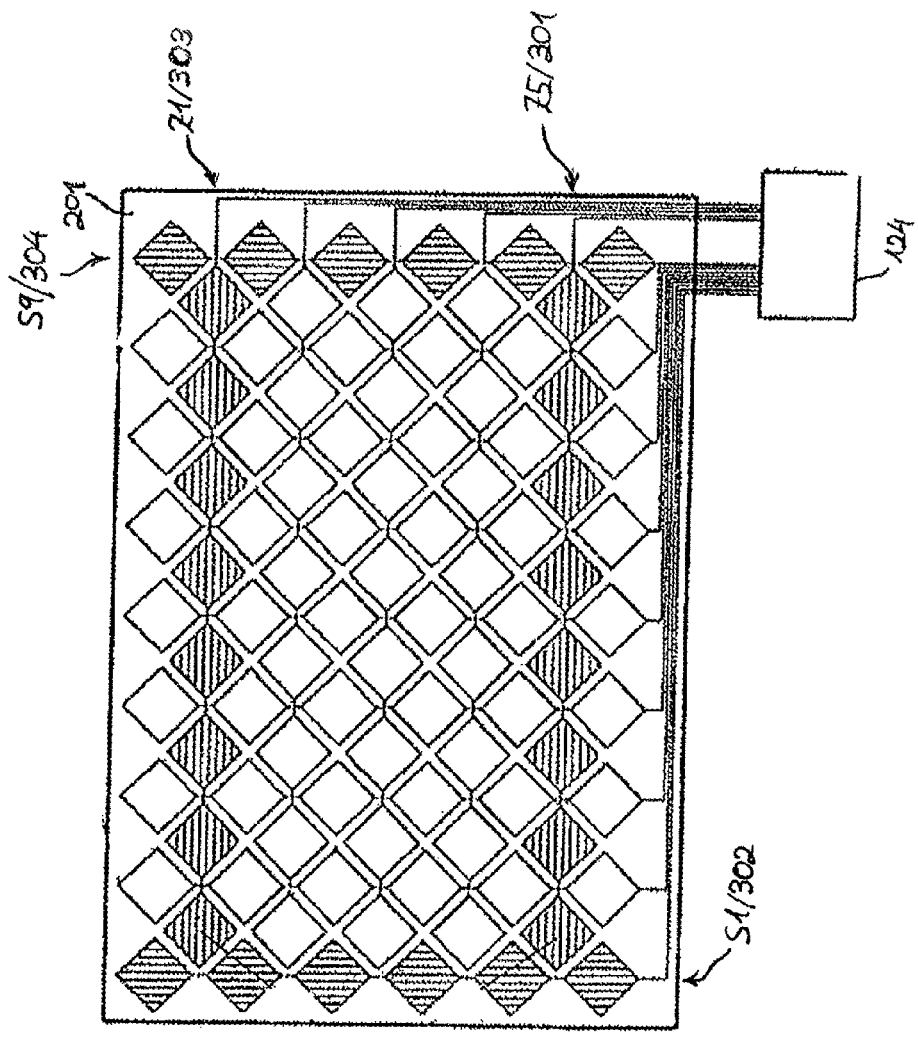
FIG. 10 is a top view of a general schematic representation of a touch-sensitive display combined with contact-free detection means, which is in accordance with some embodiments of the invention.

As shown in FIG. 10, four of the rhombus lines close to the edge (i.e., segment lines Z1/303 and Z5/301 formed by horizontal grouping, segment columns S1/302 and S9/304 formed by vertical grouping) are used for determining second positional information. By using electrode segments grouped into lines and columns, a "frame" of gesture recognition electrodes is obtained.

The upper horizontal electrode segment group Z1/303 and the lower horizontal electrode segment group Z5/301, as well as both left and right electrode columns S1/302 and S9/304 (close to the edge) used for determining second positional information are highlighted by shading. Both the horizontal electrode segment group Z1/303 and Z5/301 are employed for determining the y-position of a mean position of a user's finger 500. Simultaneously or directly following the y-position determination, an analysis may be performed, by means of which, by grouping electrode segments, an elongated detection electrode is formed each in the left edge area S1/302 an in the right edge area S9/304. By those two electrode groups S1/302, S9/304, an x-position of the mean position of the user's finger 500 may be determined. Further, the z-distance of the mean position of the user's finger is calculated from the measured signals. For determining the mean position, other analysis approaches may be employed.

It is possible to have further electrodes, such as a back electrode 306 serving as a ground electrode 306, in the display area that assist the determination of the second positional information. By means of these additional electrodes, for example, the predefined distance may be enlarged, so that portions of the user input object (such as the user hand) contribute to the spatial arrangement determined by the contact-free detection means.

In an electronic device featuring such a display, first and second positional information may be determined simultaneously and/or alternately. For this purpose, multiplexing, in particular time-division-multiplexing and/or frequency-division-multiplexing, is employed.

The controller means 120, in particular the contact-free-detection controller 124, comprise a group-driver, wherein the group driver determines which electrode segment group Z1/303, Z5/301, S1/302, S9/304, (or, if necessary, which single electrode segments 204) are currently employed for determining the second positional information. The group-drive may forward information regarding the current electrode segment grouping to a compensation controller, which as such imposes specific characterizing values or preferences and reference levels, which are taken into consideration for analyzing the electric field phenomena detected via the electrode segment groups Z1/303, Z5/301, S1/302, S9/304. These characterizing values may be the total capacity or the normal ground of the currently active electrode system in a configuration, wherein no external influence (such as external influences resulting from the user input object) persist. The characterizing values may then be considered as calibration values. The compensation controller may be a separate entity or an integral part of the contact-free-detection controller 124.

The controller means 120, in particular the contact-free-detection controller 124 for temporarily activating electrode segment lines and columns and for analyzing the signals measured via the activated electrode segment lines and columns, may be implemented as ASIC 120/124. ASIC 120/124 may be arranged close to the screen layer 201 and may be physically connected to the screen layer 201. ASIC 120/124 may be designed so that it is adapted for simultaneously and/or alternately determining the first positional information via the touch-sensitive surface 200 and the second positional information via the contact free detection means 300. ASIC 120/124 may be designed so that certain functions thereof may be defined by programming ASIC 120/124. ASIC 120/124 may be designed so that ASIC 120/124 defines which electrode segment groups (in particular which electrode segment lines Z1 . . . Z5 and electrode segment columns S1 . . . S9) of the electrode segment array are currently employed for determining second positional information.

ASIC 120/124 itself provides the signals regarding the first positional information (in particular regarding the first position) in the way prior art touch-sensitive surfaces would do. In addition, the ASIC 120/124 provides the signals regarding the second positional information (in particular regarding the second position). In the ASIC 120/124, an application may be running that performs a specific pre-analysis regarding the determined first and second positional information. ASIC 120/124 may use the first positional information and, depending thereon, may choose electrode segment groups that should be employed for determining second positional information. This is advantageous because the precision of determining the second positional information may be improved by choosing appropriate electrode segment groups. ASIC 120/124 may determine second positional information by analyzing changes of the capacitive coupling against ground, coupling-in of a potential, and/or the change of dielectric properties of the environment of the activated electrode segment group(s), which may, for example, be induced by moving a user input object within the predefined distance on front of touch-sensitive surface 200. Different measurement approaches may be employed by the ASIC 120/124 for this purpose. A typical measurement approach consist in, for example, detecting coupling of the activated electrode segments against a ground electrode as an analogue signal (i.e., a signal varying within a certain range).

The contact-free-detection controller 124 may comprise RX and TX connectors. It is possible, for example, by channel-multiplexing, to employ a plurality of electrode segments chains for determining second positional information. Analysis of the signal levels at the corresponding electrode segment chains may be performed in that a multi object recognition is performed (e.g., the recognition of two finger tips and corresponding determining of first and second positional information for each of the finger tips).

Figure 11:
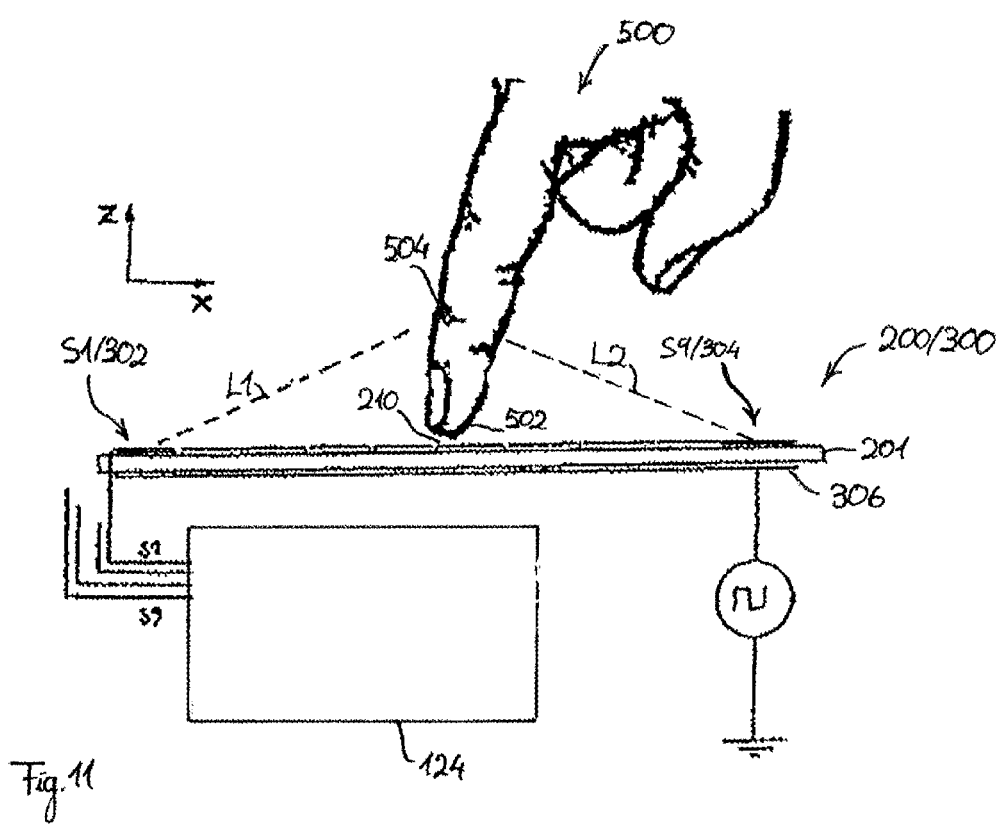
FIG. 11 is a side view of a general schematic representation of a touch-sensitive display combined with contact-free detection means, which is in accordance with some embodiments of the invention.

In FIG. 11, a touch-sensitive display 200 combined with contact-detection means 300 according to the example embodiments is shown, wherein the determination of the first and second positional information is displayed in more detail. By means of the electrode segments that are close to the edge and grouped into segment columns S1/302 and S9/304, signal levels are detected, which are indicative for the distances L1, L2 of the mean position of the user's finger 500 with regard to the touch-sensitive surface 200. From these signal levels, the x- and z-distance of a mean position of the user's finger 500 is calculated. The signal detection is performed by means of a group-driver that successively connects specific electrode segment groups of the touch-sensitive display 200 with the controller means 120, in particular with the contact-free diction controller 124. The latter comprises an analogue-to-digital converter (ADC) and calculates the first and second positional information from the accordingly obtained digital second signal positional information. The touch-sensitive display has an ITO layer 306 arranged on the back side, which is opposite to the side having the electrode segments 204 arranged thereon. A square-wave signal is applied to the ITO-layer 306 arranged on the back side.

The touch-sensitive surface 200 and the contact-free detection means 300 may be built from a prior art touch-sensitive display 200 and controller means 120 according to the invention.

The electrode segments of the electrode array may be implemented in a transparent multi-layer screen structure. For achieving particularly reliable isolation of the intersecting points between the electrode segments, the electrode segments forming electrode segment lines may be arranged in a different layer than the electrode segments forming electrode segment columns, and/or the electrode segments forming electrode segment lines and the electrode segments forming electrode segment columns are arranged on opposite sides of one layer. Further, on the side that is facing away from the user during use, a back electrode 306 (which, for example, may serve as ground electrode) may be formed by the VCOM layer.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The skilled person understands that technical features of different embodiments may be arbitrarily combined, modified, and/or removed. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. An electronic device for determining a first positional information and a second positional information regarding a user input object, such as at least one user hand or at least one stylus, the electronic device comprising:
    a touch-sensitive surface;
    contact-free detection unit; and
    a controller that is operatively connected with the touch-sensitive surface and with the contact-free detection unit;
    a gesture recognition module that is a separate module or an integral part of the controller,
    wherein the first positional information depends on where the user input object contacts the touch-sensitive surface, and
    wherein the second positional information depends on the spatial configuration of the user input object above the touch-sensitive surface,
    wherein the controller is adapted for simultaneously and/or alternately determining the first positional information via the touch-sensitive surface and the second positional information via the contact free detection unit, wherein the controller is further configured to determine a gesture performed by the user input object while the input object touches the touch sensitive surface;
    wherein the gesture recognition module is adapted for identifying the gesture as belonging to a predefined gesture category from tracking at least the second positional information, wherein the gesture belongs to the predefined category if the first position is determined by at least one finger of a hand, and remaining parts of the hand perform the gesture while the first position remains substantially constant; and
    wherein the electronic device is adapted for transitioning from a first state into a second state when or after the gesture is identified as belonging to the predefined gesture category by the gesture recognition module.

2. The electronic device according to claim 1, wherein the controller is adapted for simultaneously determining the first positional information and the second positional information using time-division-multiplexing and/or frequency-division-multiplexing.

3. The electronic device according to claim 1, wherein the first positional information comprises first data that depends on where the user input object contacts the touch-sensitive surface, and the second positional information comprises a second data that depends on the spatial configuration of the user input object.

4. The electronic device according to claim 3, wherein the first positional information comprises a mean position of where the user input object contacts the touch sensitive surface.

5. The electronic device according to claim 3, wherein the second position is a mean position of the user input object or of a portion of the user input object.

6. The electronic device according to claim 1, wherein the second positional information depends on the spatial configuration of a portion of the user input object that is within a predefined distance of the touch-sensitive surface, wherein the predefined distance is preferably less than: 0.5 cm, 1 cm, 1.5 cm, 2 cm, 2.5 cm, 3 cm, 3.5 cm, 4 cm, 4.5 cm, 5 cm, 5.5 cm, 6 cm, 7 cm, 8 cm, 9 cm, 10 cm, 15 cm, 20 cm, 50 cm, 1 m, 2 m, 5 m, or 10 m.

7. The electronic device according to claim 1, wherein the first positional information is determined and/or represented in two dimensions, and/or wherein the second positional information is determined and/or represented in three dimensions.

8. The electronic device according to claim 1, wherein both the first positional information and the second positional information are determined and/or represented in the same coordinate system,
    wherein both the first and the second positional information are preferably determined and/or represented in the same coordinate system,
    wherein both the first positional information and the second positional information is preferably determined relative to a reference position on the touch-sensitive surface.

9. The electronic device according to claim 1, wherein the touch-sensitive surface is part of a touch-sensitive display.

10. The electronic device according to claim 1, wherein the contact-free detection unit comprise a contact-free 3D scanner, which is of the active or the passive type.

11. The electronic device according to claim 10, wherein the contact-free 3D scanner comprises at least one video camera for recording images of the user input object and an image analysis controller for determining the second positional information from the recorded images, wherein the image analysis module is a separate module or an integral part of the controller.

12. The electronic device according to claim 1, wherein the contact-free detection unit comprises capacitive sensing unit, which in turn comprise:
    an electric field generation unit for generating an electric field that is static or quasi-static;
    electric field detection electrodes for detecting changes of the electric field caused by the user input object, wherein the electric field detection electrodes are separate from or an integral part of the electric field generation unit.

13. The electronic device according to claim 12, wherein the capacitive sensing unit comprises:
    an electric field generation electrode for generating an electric field that is static or quasi-static;
    the electric field detection electrodes for detecting changes of the electric field caused by the user input object, and an analysis module for determining the second positional information from the detected changes of the electric field, wherein the analysis module is a separate module or an integral part of the controller.

14. The electronic device according to claim 12, wherein the electric field generation unit and/or the electric field detection electrodes are an integral part of the touch-sensitive surface and/or of the touch-sensitive display.

15. The electronic device according to 1, wherein the gesture recognition module is adapted for:
    preferably storing and/or obtaining a predefined gesture category,
    recording a gesture from the first and the second positional information, wherein, the gesture is tracked as long as the user input object touches the touch-sensitive surface,
    identifying the recorded gesture as belonging to the predefined gesture category.

16. The electronic device according to claim 15, wherein the device is configured to extract a parameter from the identified gesture, such as a zoom factor, or a discrete rotation angle.

17. The electronic device according to claim 15, wherein the gesture comprises a trajectory in a phase space, the phase space being defined by all possible states of the first and the second positional information.

18. The electronic device according to claim 1, wherein a gesture belongs to the predefined category:
- if the second position moves on a substantially circular trajectory around a rotational axis, the rotational axis being perpendicular to the touch-sensitive surface and intersecting the first position, the first position remaining substantially constant, or
- if the second position moves on a trajectory, which is substantially a line, towards or away from the touch-sensitive surface, the first position remaining substantially constant, the line preferably being perpendicular to the touch-sensitive surface, or
- if the second position moves on a substantially circular trajectory around a rotational axis, the rotational axis lying within the touch-sensitive surface and intersecting the first position, the first position remaining substantially constant, or
- if the second position moves on a trajectory, which is substantially a line, in parallel to the touch-sensitive surface, the first position remaining substantially constant, or
- if the first and the second position simultaneously move in substantially the same direction,
- wherein said same direction is substantially parallel to the touch-sensitive surface.

19. The electronic device according to claim 1, wherein the gesture recognition module is adapted for determining a vector, wherein the initial point of the vector is the first position and the terminal point of the vector is the second position.

20. The electronic device according to claim 1, wherein the gesture recognition module is adapted for determining the second position in a cylindrical coordinates system and/or transforming the second position into a cylindrical coordinates system, wherein the origin of the cylindrical coordinates system is the first position, wherein the height axis is perpendicular to the touch-sensitive surface, and wherein the reference axis lies within the touch sensitive surface.

21. The electronic device according to claim 1, wherein a start of a gesture is detecting a touch and an end of the gesture is defined by detecting a release of the touch.

22. A method for determining a first positional information and a second positional information regarding a user input object by controlling an electronic device comprising a touch-sensitive surface, a contact-free detection unit, and a controller that is operatively connected with the touch-sensitive surface and with the contact-free detection unit, wherein the first positional information depends on where the user input object contacts the touch-sensitive surface, and wherein the second positional information depends on the spatial configuration of the user input object with regard to the touch-sensitive surface, the method comprising the steps of:
- determining the first positional information via the touch-sensitive display,
- determining and tracking at least the second positional information via the contact free detection unit while the input object touches the touch sensitive surface; and
- determining a gesture from at least the tracked second positional information.

23. The method according to claim 22, wherein the steps of determining the first position and the second position are performed using a time-division-multiplexing method and/or a frequency-division-multiplexing method.

24. The method according to claim 22, wherein a start of a gesture is detecting a touch and an end of the gesture is defined by detecting a release of the touch.

25. A method for determining a first positional information and a second positional information regarding a user input object by controlling an electronic device comprising a touch-sensitive surface, a contact-free detection unit, and a controller that is operatively connected with the touch-sensitive surface and with the contact-free detection unit, wherein the first positional information depends on where the user input object contacts the touch-sensitive surface, and wherein the second positional information depends on the spatial configuration of the user input object with regard to the touch-sensitive surface, the method comprising:
- determining the first positional information and the second positional information while the electronic device is in a first state;
- recording a gesture by tracking at least the second positional information while the input object touches the touch sensitive surface,
- transitioning the electronic device to a second state if the detected gesture belongs to a predefined gesture category; and
- maintaining the device in the first state if the detected phase space trajectory does not belong to a predefined gesture category.

26. The method according to claim 25, wherein the first positional information remains substantially constant.

27. The method according to claim 25, further comprising the step of extracting a parameter from the identified gesture, such as a zoom factor, or a discrete rotation angle.

28. An electronic device for determining a first positional information and a second positional information regarding a user input object, such as at least one user hand or at least one stylus, the electronic device comprising:
- a two-dimensional touch-sensitive surface;
- three-dimensional contact-free detection unit, wherein the three-dimensional contact-free detection unit, which in turn comprise:
- an electric field generation unit for generating an electric field that is static or quasi-static:
- electric field detection electrodes for detecting changes of the electric field caused by the user input object, wherein the electric field detection electrodes are separate from or an integral part of the electric field generation unit; and
- a controller operatively connected to the touch-sensitive surface and to the contact-free detection unit:
- wherein the first positional information is generated by at least one finger of a hand defining a touching position and comprises first data that depends on where the user input object contacts the touch-sensitive surface, and
- wherein the second positional information defines a gesture generated at least by remaining parts of the hand while the at least one finger maintains its touching position and comprises second data that depends on the spatial configuration of at least the remaining parts of the hand above the touch-sensitive surface,
- wherein the controller is adapted to determine and to output the first positional information via the touch-sensitive surface and to track the second positional information via the contact free detection unit, wherein the controller is adapted for simultaneously determining the first positional information and to track the second positional information using time-division-multiplexing and/or frequency-division-multiplexing.

29. The electronic device according to claim 28, wherein a start of a gesture is detecting a touch and an end of the gesture is defined by detecting a release of the touch.

* * * * *